United States Patent
Hagano

(10) Patent No.: US 6,814,251 B2
(45) Date of Patent: Nov. 9, 2004

(54) CAP DEVICE

(75) Inventor: Hiroyuki Hagano, Aichi-ken (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/347,395

(22) Filed: Jan. 21, 2003

(65) Prior Publication Data
US 2003/0136785 A1 Jul. 24, 2003

(30) Foreign Application Priority Data
Jan. 22, 2002 (JP) .......................... 2002-013109

(51) Int. Cl.$^7$ .................. B65D 51/18; B65D 53/02; B65D 55/16
(52) U.S. Cl. .................. 220/288; 220/293; 220/304; 220/DIG. 33
(58) Field of Search .................. 220/288, 293, 220/304, DIG. 33

(56) References Cited

U.S. PATENT DOCUMENTS

| 4,132,091 A | * | 1/1979 | Aro et al. ................. 70/165 |
| 4,342,208 A | | 8/1982 | Evans |
| 5,183,173 A | | 2/1993 | Heckman |
| 6,202,879 B1 | | 3/2001 | Gericke |
| 6,308,582 B1 | * | 10/2001 | Bender ................. 73/861.57 |
| 6,568,553 B2 | * | 5/2003 | Hagano et al. ............. 220/304 |
| 2003/0098307 A1 | * | 5/2003 | Hagano et al. |

FOREIGN PATENT DOCUMENTS

EP   1 040 952 A2 A3   10/2000

* cited by examiner

Primary Examiner—Derris H. Banks
Assistant Examiner—Dmitry Suhol
(74) Attorney, Agent, or Firm—Posz & Bethards, PLC

(57) ABSTRACT

A fuel cap 10 comprises a casing body 20, a handle mechanism 40, a clutch mechanism 60, and a torque mechanism 80. The clutch mechanism 60 comprises a clutch switch 61 in the form of a cantilever which is pushed during the installation operation, and a one-way clutch unit. Squeezing an operating portion 47 and operating in the closing direction causes the clutch switch 61 to flex, maintaining a clutch arms 62 and clutch teeth 64 in the engaged state so that rotational torque is transmitted. The fuel cap 10 maintains a good seal even if the handle mechanism 40 should be subjected to external force, while at the same time providing superior ease of operation during installation and removal.

13 Claims, 13 Drawing Sheets

CAP DEVICE

This application claims the benefit of and priority from Japanese Application No. 2002-13109 filed Jan. 22, 2002, the content of which is incorporated herein by reference.

BACKGROUND OF THE INVENTION

1. Field of the Invention

The present invention relates to a cap device detachably attachable to the member with a tank opening.

2. Description of the Related Art

Known fuel cap of the kind are disclosed in U.S. Pat. No. 6,202,879. Specifically, the fuel cap comprises a housing having a gasket disposed thereon, for providing closure to the opening of a filler neck; a cover disposed on the upper portion of the housing and having an operating handle; and an interlock mechanism disposed between the housing and the cover, for switching between a transmitting mode, in which rotational torque of the cover is transmitted to the housing, and a non-transmitting mode in which rotational torque is not transmitted.

The interlock mechanism comprises cantilevered engaging switches extended outwardly to either side of the operating handle. To install or remove the fuel cap, the operating handle is squeezed to cause the engaging switches to sandwich and hold a support shaft integral with the housing so that rotational force is transmitted to the housing, thereby allowing the cap to be installed or removed. With the fuel cap closed, the engaging switches do not sandwich the support shaft, so that the cover and handle turn freely with respect to the housing. Thus, if the cover and handle should be subjected to external force they will simply spin without rotating the housing, thereby preventing loss of seal by the gasket.

However, since the engaging switches are induced to sandwich and interlock with the support shaft by means of squeezing force applied to the handle when installing or removing the fuel cap, it is necessary to for the user to apply a high level of force in order to maintain the interlock, so poor ease of operation is a problem.

SUMMARY OF THE INVENTION

The present invention is intended to solve this problem of the prior art, and has as an object to provide a fuel cap that maintains a good seal even if subjected to external force, while at the same time providing superior ease of operation.

To solve the above problem, the present invention provides a cap device comprising a cap configured to open and close a tank opening. The cap comprises: a closer for closing the tank opening with air-tight sealing; a handle mechanism rotatably mounted on the closer, the handle mechanism having an operation portion that is operable to close and open the tank opening; and an interconnecting mechanism, provided between the handle mechanism and the closer, the interconnecting mechanism transmitting to the closer rotational torque in a closing direction and an opening direction when the rotational torque is applied to the handle mechanism to close and open the tank opening. The interconnecting mechanism comprises: a clutch switch having a closing position and an opening position, the clutch switch being configured to be switchable from the closing position to the opening position when a user operates the cap to open the tank opening; and an one-way clutch unit having a first transmission mode and a second transmission mode, the first transmission mode being a mode in which the one-way clutch unit transmits the torque applied to the handle mechanism in the closing direction to the closer within a predetermined range and rotates freely in the opening direction when the clutch switch is switched to the closing position, the second mode being a mode in which the one-way clutch unit transmits the torque applied to the handle mechanism in the opening direction to the closer when the clutch switch is switched to the opening position.

According to the cap device pertaining to the present invention, when the operating portion is squeezed and turned in the closing direction, as the one-way clutch unit of the clutch mechanism is normally in the interlocked state, the rotational torque of the operating portion is transmitted to the closure member via the one-way clutch unit so that the closure member moves to the closed position engaging the neck engaging portion in order to plug the tank neck. Conversely, when the operating portion is squeezed to unplug the tank neck, the clutch switch assumes the actuated state and the one-way clutch unit assumes the interlocked state in the installing direction, whereby rotational torque is transmitted to turn the closure member in the opening direction.

During the cap device removing operation, simply by squeezing the operating portion of the handle the clutch switch is placed in the actuated state to switch the clutch mechanism to the interlocked state by means of force supporting the operating portion, thus providing superior ease of operation.

With the closure member installed in the cap neck, in the event that the handle should be subjected to force in the opening direction the one-way clutch unit will simply turn freely since the clutch switch is not in the actuated state, and thus the housing body maintains closure of the filler neck so that the seal can be preserved.

In a preferred embodiment the clutch switch is constituted by a cantilever formed on the side wall of the operating portion and is designed to switch the one-way clutch unit to the interlocked state by flexing when the free end of the cantilever is pushed during the removal operation.

The clutch switch can be designed to have flexural rigidity when the operating portion is squeezed that is lower than flexural rigidity towards the direction of maintaining the one-way clutch unit in the interlocked state. Further, the one-way clutch unit may comprise clutch teeth arranged in a circle; and a clutch pawl for engaging and disengaging the clutch teeth. The clutch switch may be designed to restrict movement of the clutch pawl to effect shifting to the interlocked state.

With such a clutch switch arrangement, rather than using squeezing force applied by the user to the operating portion in order to maintain the clutch mechanism in the engaged state, i.e., for the clutch pawl to maintain pushing force against the clutch teeth, the high rigidity of the cross sectional secondary moment of the clutch switch is utilized, whereby the clutch mechanism will not switch to the disengaged state as long as the user does not relax the squeezing force applied to the operating portion so as to allow the clutch switch to return to its original position, thus providing superior ease of operation.

In a preferred embodiment the handle comprises a handle body furnished with a clutch switch; and a torque interlock member attached to the handle body and furnished with the one-way clutch unit.

Further, the handle may comprise a handle cover covering the handle body and constructed of pliable material that is deformable so as to transmit force inducing elastic deformation of the clutch switch. The handle cover covers the upper face of the handle body, protecting it from rainwater and the like.

In a preferred embodiment the cap device further comprises a torque mechanism that ceases to transmit torque when the handle is subjected to rotational torque in excess of a predetermined level in the opening direction. There are various possible arrangements for such a torque mechanism, for example, an arrangement comprising clutch teeth arranged in a circle, and a torque arm that rides up over the clutch teeth when subjected by the clutch teeth to rotational torque in excess of a predetermined level. With this arrangement, a tactile warning is provided when the clutch teeth of the torque mechanism rides up over the torque arm, allowing the user to ascertain that the closure member has been tightened to a predetermined level of torque, thus affording consistent seal force.

DESCRIPTION OF THE PREFERRED EMBODIMENTS

The arrangement and advantages of the invention described hereinabove will be better understood by reference to following description of certain preferred embodiments.

(1) General Arrangement of Fuel Cap 10

Figure 1:
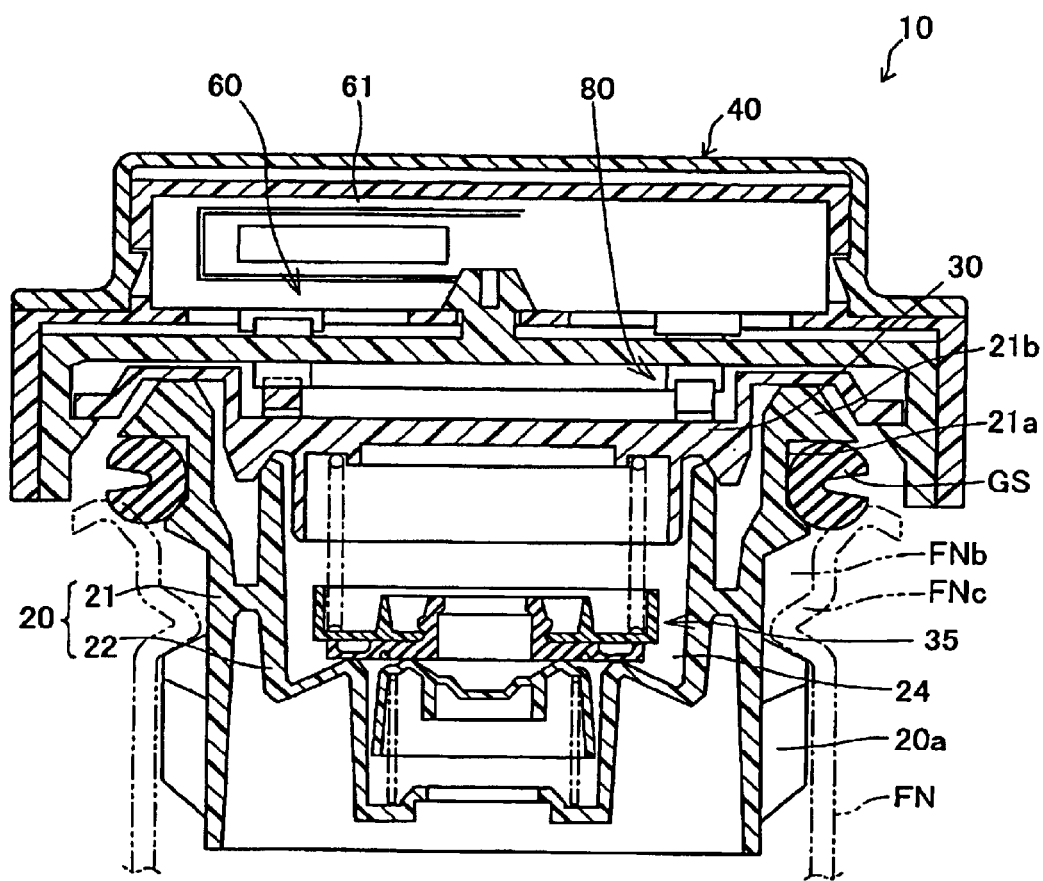
FIG. 1 is a sectional view showing a cap device comprising a fuel cap pertaining to an embodiment of the invention.
Figure 2:
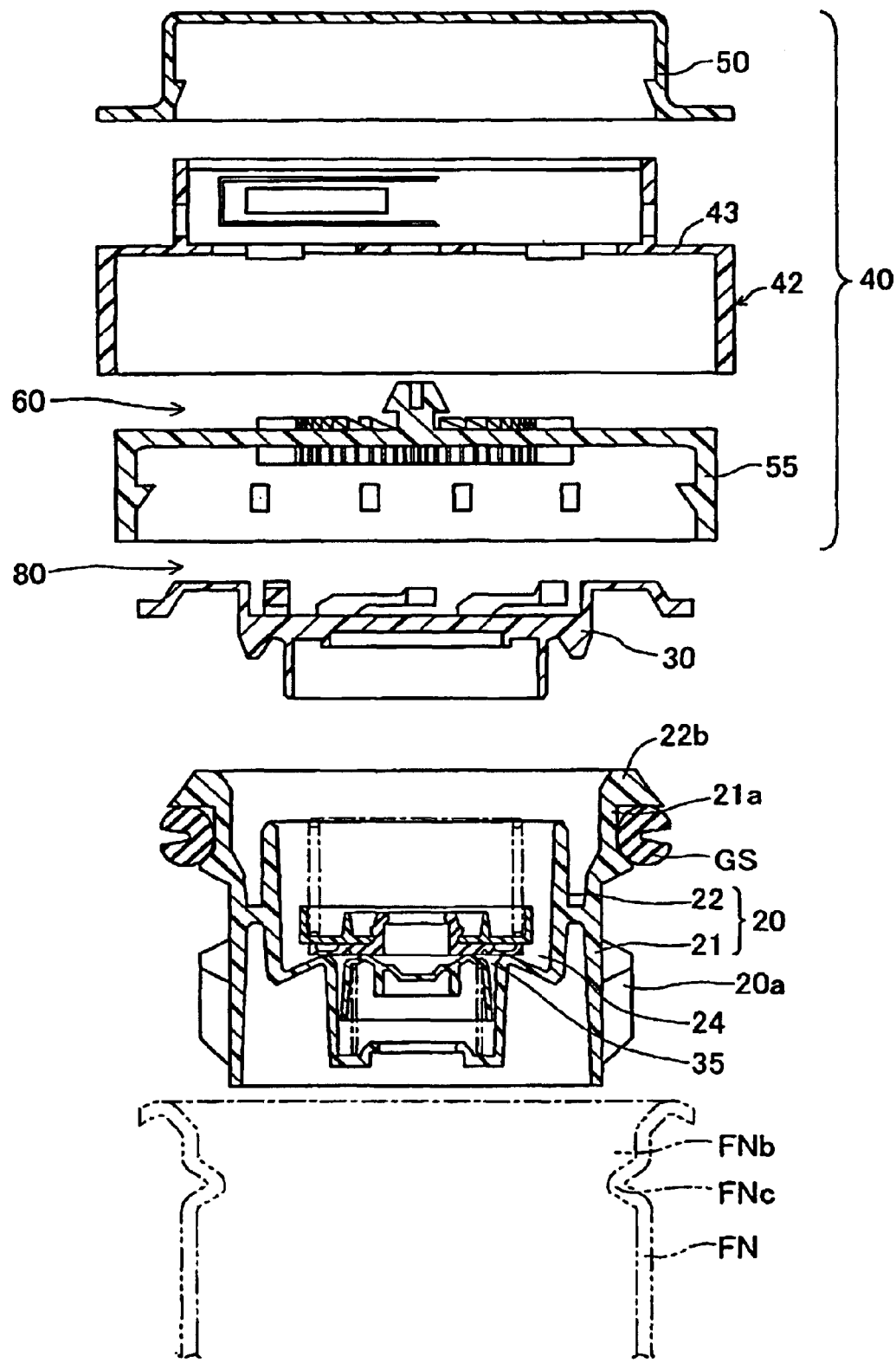
FIG. 2 is a sectional view showing the fuel cap disassembled.

FIG. 1 is a sectional view showing a cap device comprising a fuel cap 10 pertaining to an embodiment of the invention; and FIG. 2 is a sectional view showing the fuel cap 10 disassembled. In FIGS. 1 and 2, the fuel cap 10 is s attached to a filler neck FN having a filler neck opening FNb (tank neck) for supplying fuel to a fuel tank, not shown, and comprises a casing body 20 (closer) made of polyacetal or other synthetic resin material; an inner seal plate 30 providing closure to the upper opening of the casing body 20, forming a valve chamber 24; a regulator valve 35 housed within the valve chamber 24; a handle mechanism 40 disposed on the upper portion of the casing body 20; a clutch mechanism 60 for selective transmission or non-transmission of the rotational torque of the handle mechanism 40 to the casing body 20; a torque mechanism 80 for installing the casing body 20 at a level of rotational torque not exceeding a predetermined level; and a gasket GS disposed on the upper outside rim of the casing body 20 to provide a seal between the casing body 20 and the filler neck FN.

With the fuel cap 10 arrangement, the filler neck opening FNb can be capped or uncapped by squeezing and turning the handle mechanism 40 while installing or removing the fuel cap 10 within or from the filler neck FN.

(2) Arrangement of Parts

The various parts of the fuel cap 10 pertaining to the present embodiment are described in detail hereinbelow.

(2)-1 Casing Body 20

The casing body 20 comprises a substantially round cylindrical sleeve 21 and a valve chamber forming-member 22 integrally formed with the cylindrical sleeve 21. The valve chamber forming-member 22 houses a positive pressure valve and negative pressure valve that function as a regulator valve 35. The inner seal plate 30 is welded by an ultrasonic welding technique onto the upper portion of the valve chamber forming-member 22 to form the valve chamber 24.

The gasket GS is outwardly disposed at the bottom edge of a flange 21b in the upper portion of the casing body 20. The gasket GS is interposed between a seal retaining portion 21a of the flange 21b and the filler neck opening FNb of the filler neck FN, so as to be forced against the seating face of the filler neck FN when the fuel cap 10 is tightened in the filler neck opening FNb, providing a sealing action.

Figure 3:
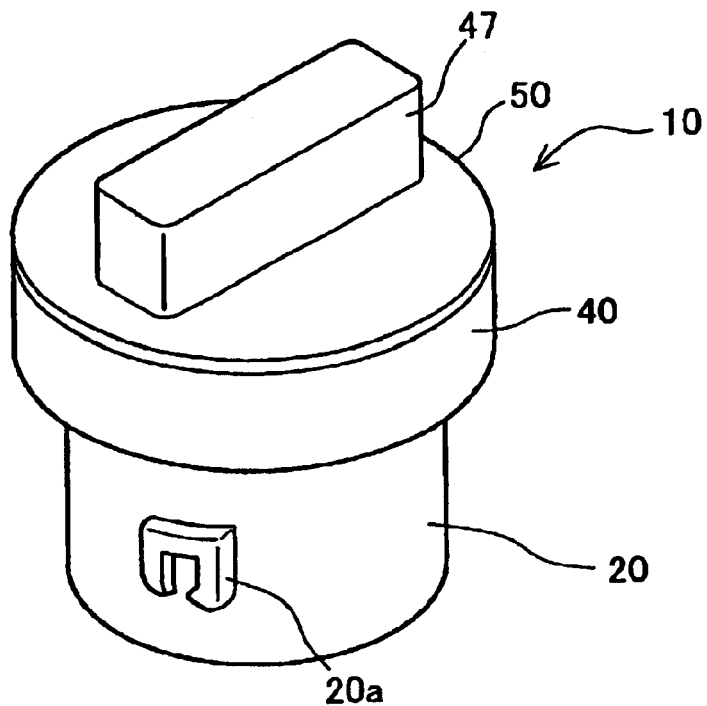
FIG. 3 shows the relationship of the casing engaging portion of the casing body to the filler neck.
Figure 3:
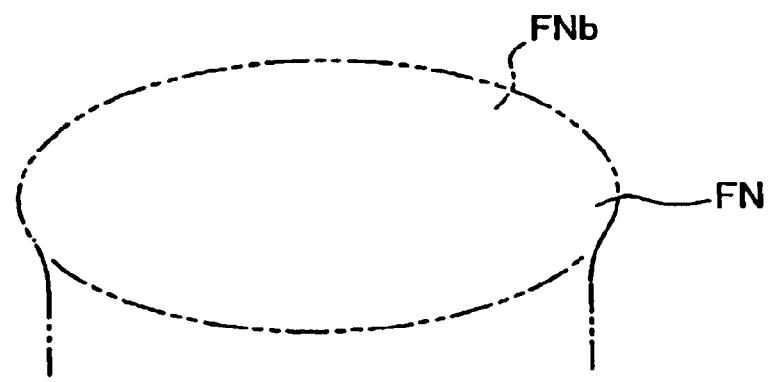
Figure 3:
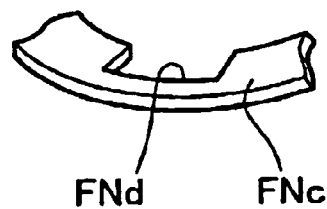

FIG. 3 shows the relationship of the casing engaging portion 20a of the casing body 20 to the filler neck FN. The casing engaging portion 20a is formed on the outside wall of cylindrical tube 21. A neck engaging portion FNc is formed on the inside wall of the filler neck FN. On a portion of the inside wall of the neck engaging portion FNc is formed a neck insertion notch FNd into which the casing engaging portion 20a is insertable in the axial direction of the cap 10. With the casing engaging portion 20a aligned with neck insertion notch FNd and the fuel cap 10 installed in the filler opening FNb of the filler neck FN, turning the fuel cap 10 by a predetermined angle (about 90°) causes the casing engaging portion 20a to be engaged by the neck engaging portion FNc to attach the fuel cap 10 to the filler neck FN.

(2)-2 Structure of Handle Mechanism 40

Figure 4:
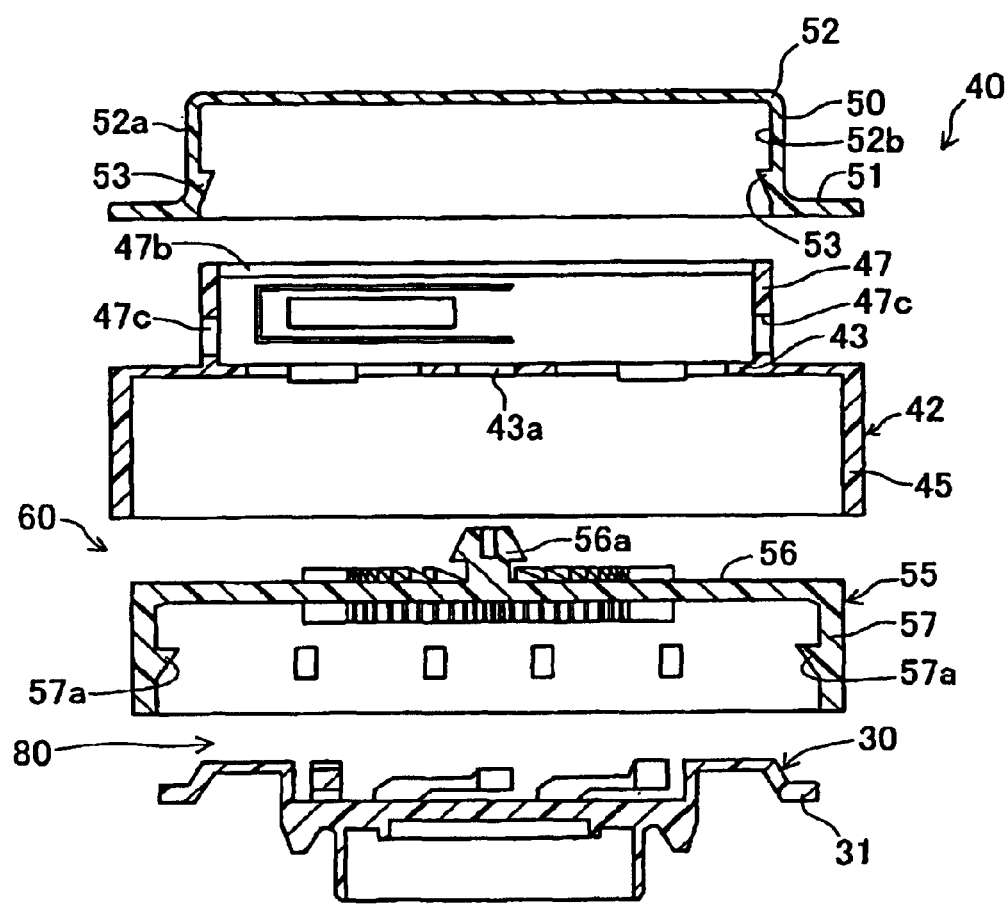
FIG. 4 is a sectional view showing a handle mechanism disassembled.
Figure 5:
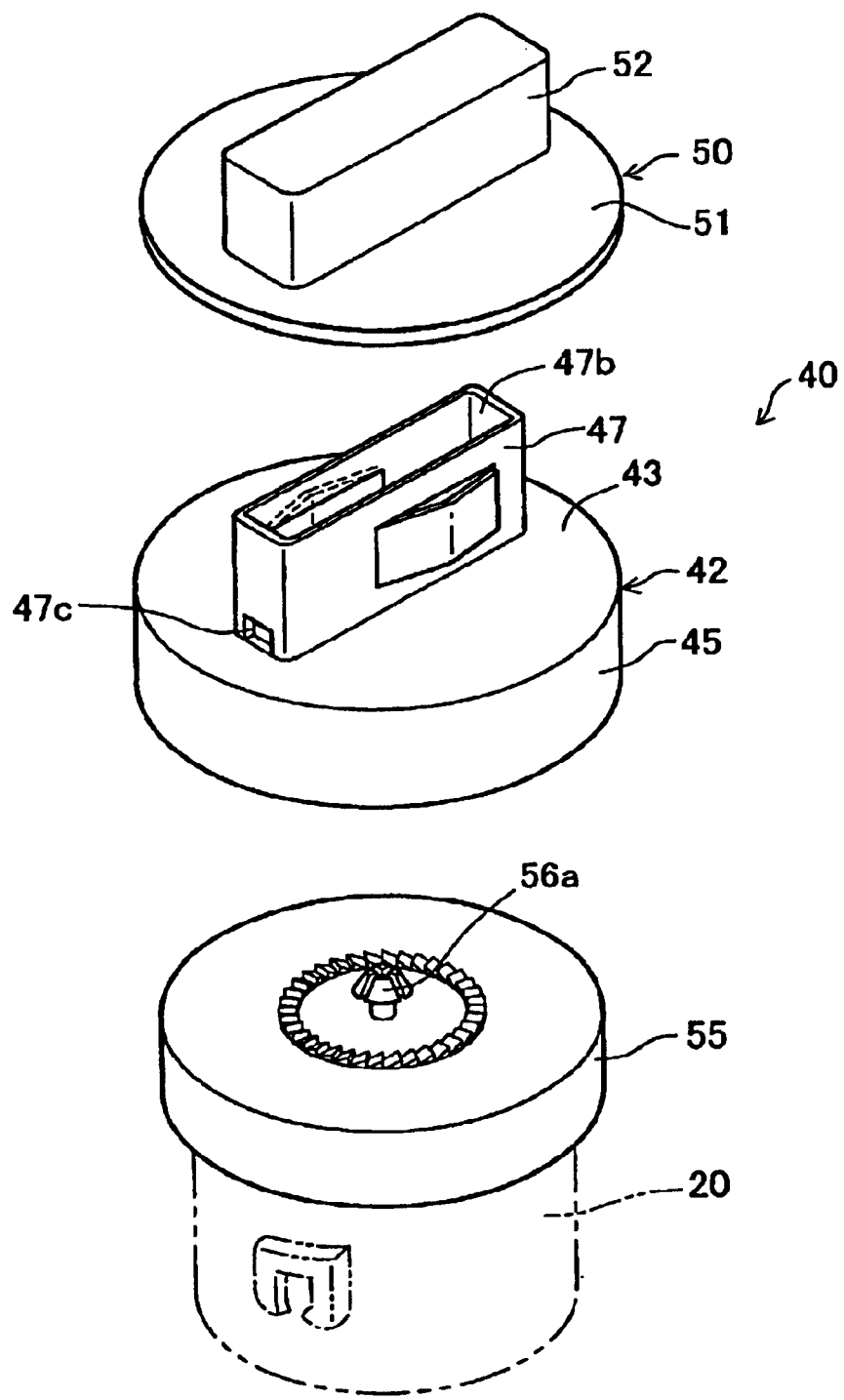
FIG. 5 is a perspective view showing the handle mechanism disassembled.

FIG. 4 is a sectional view of the handle mechanism 40 and adjacent parts; and FIG. 5 is a perspective view showing the handle mechanism 40 and adjacent parts disassembled. The handle mechanism 40 is rotatably and detachably disposed on the upper portion of the casing body 20 (FIG. 1), and comprises a handle body 42, a handle cover 50 disposed on the handle body 42, and a torque interlock member 55 disposed on the lower portion of the handle body 42.

a. Handle Body 42

The handle body 42 comprises an upper wall 43; a side wall 45 formed along the outside edge of the upper wall 43 integrally formed with the upper wall 43 defining a cup shape; and an operating portion 47 projecting up from the upper portion of the upper wall 43; and is integrally molded of polyacetal (POM) or similar material using an injection molding. The operating portion 47 constitutes a member grasped with the fingers. The top portion of the operation portion 47 has an upper opening 47. Detent openings 47c for engaging the handle cover 50 are formed in the side wall 47a. A connector hole 43a for connection to the torque interlock member 55 is formed in the center of the upper wall 43.

b. Handle Cover 50

The handle cover 50 is a cover for covering the upper face of the handle body 42 to protect the inner parts of the casing main body 20 from rainwater and the like. The handle cover 50 comprises a flat panel 51, and an operating cover 52 projected upwardly from the flat panel 51, and is fabricated of soft resin, for example, polyvinyl chloride (PVC) or thermoplastic elastomer (TPE). The operating cover 52 comprises a housing recess 52b that mates with the operating portion 47 of the handle body 42, and is installed on the handle body 42 by the engaging projections 53 formed on the inside of the side wall 52a within the detent openings 47c of the handle body 42.

c. Torque Interlock Member 55

The torque interlock member 55 constitutes a portion of a clutch mechanism 60 and a torque mechanism 80 described later, and is of inverted cup shape enclosed by an upper wall 56 and a side wall 57 extended downward from the upper wall 56. The torque interlock member 55 is made of polyamide (PA), polypropylene (PP) or similar material by injection molding. From the center of the upper wall 56 there projects up a snap-fit connector projection 56a. By pressing the connector projection 56a into the connector hole 43a of the handle body 42, the torque interlock member 55 rotatably supports the handle body 42. Support projections 57a projects out from the inside of the side wall 57. Eight support projections 57a are disposed at a interval (six locations are shown in FIG. 4) along the circumference of the side wall 57, and by means of engaging the flange 31 of the inner seal plate 30 (see FIG. 1) the torque interlock member 55 is rotatably mounted on the casing body 20 via the inner seal plate 30.

(2)-3 Arrangement of Clutch Mechanism 60

Figure 6:
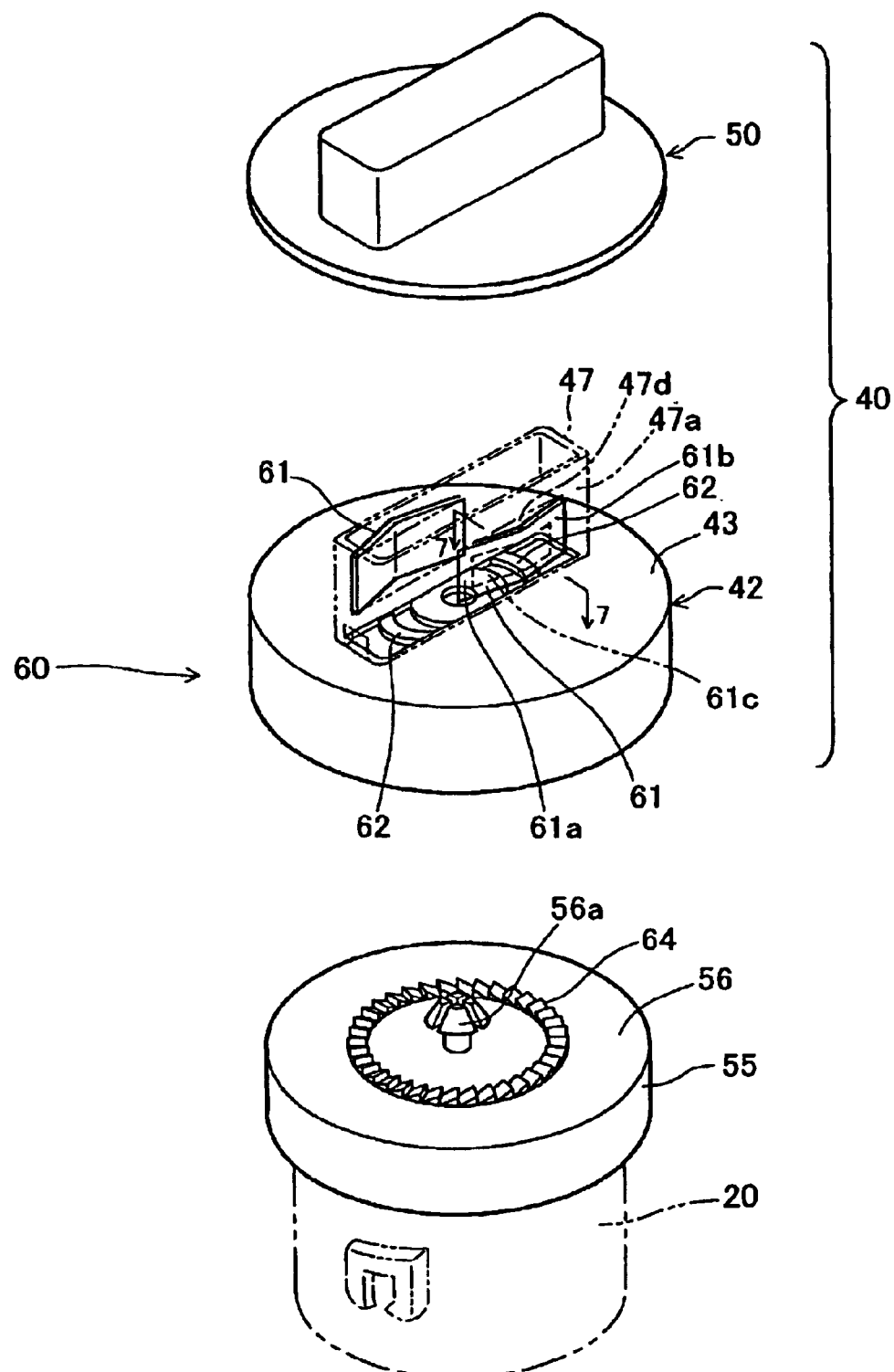
FIG. 6 is a perspective view illustrating the clutch mechanism.
Figure 7:
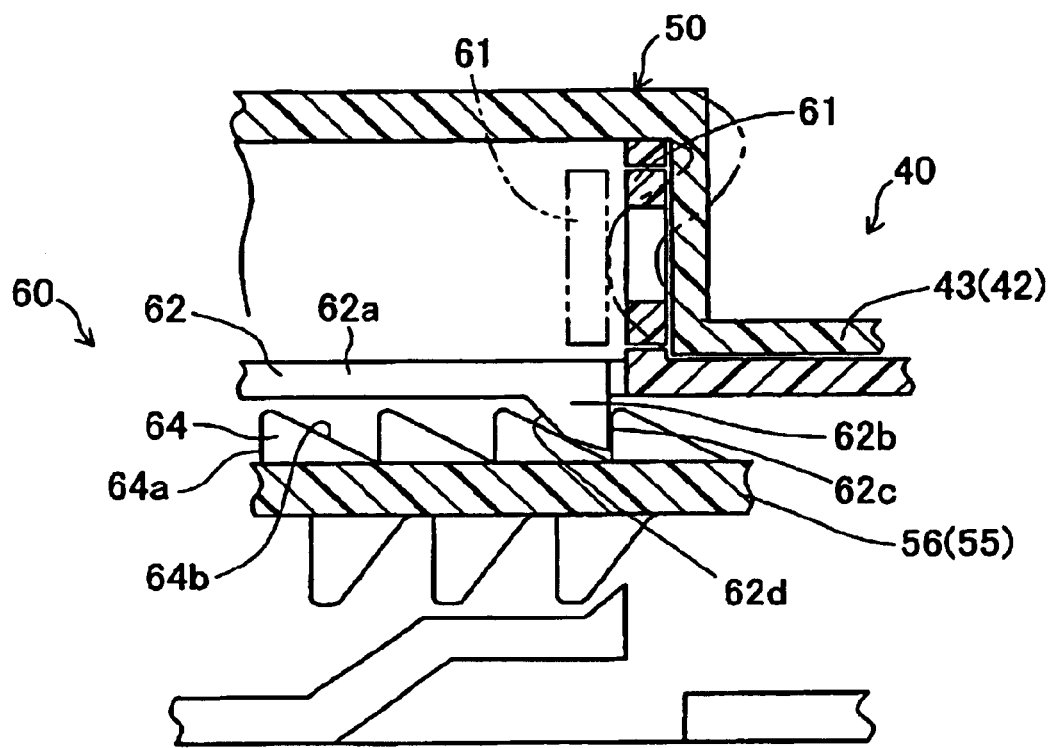
FIG. 7 is a sectional view taken along line 7—7 in FIG. 6.

FIG. 6 is a perspective view illustrating the clutch mechanism 60; and FIG. 7 is a sectional view taken along line 7—7 in FIG. 6. To facilitate understanding some of the contour lines in FIG. 6 are rendered as double-dot dashed lines. The clutch mechanism 60 is a mechanism for selectively transmitting or not transmitting rotational force between the handle body 42 and the torque interlock member 55. The clutch mechanism 60 is disposed between the torque interlock member 55 and the handle body 42 of the handle mechanism 40, and comprises a clutch switch 61, clutch arms 62 and clutch teeth 64. The clutch arms 62 and clutch teeth 64 are normally interlocked with respect to operation of the handle 40 in the closing direction, and constitute a one-way clutch unit that switches from the de-interlocked state to the interlocked state with respect to operation of the handle 40 in the opening direction.

The clutch switch 61 is a bowed cantilever formed at an end of a switch opening 47d in the side wall 47a of the operating portion 47, i.e. having the an end integrally linked to the side wall 47a at a support end 61a, with the other end constituting a free end 61b. By pushing the free end 61b the clutch switch 61 flexes inwardly about the support end 61a to assume the actuated state. To minimize the effects of resin shrinkage, the clutch switch 61 has an opening 61c formed therein.

The clutch arms 62 are formed as a pair of arcuate shapes on the upper wall 43 of the handle body 42. As shown in FIG. 7, each of the clutch arms 62 comprises an arm body 62a fixed at an end thereof on the upper wall 43 with the other end constituting a free end, and a clutch pawl 62b formed extending downwardly from the free end of the arm body 62a. The clutch pawl 62b has vertical face 62c and a sloped face 62d formed thereon.

The clutch teeth 64 are arranged in a circle on the upper face of the upper wall 56 of the torque interlock member 55. Each of the clutch teeth 64 has a vertical face 64a and a sloped face 64b formed thereon, and is configured to engage the clutch pawl 62b of the clutch arm 62.

(2)-4 Arrangement of Torque Mechanism 80

Figure 8:
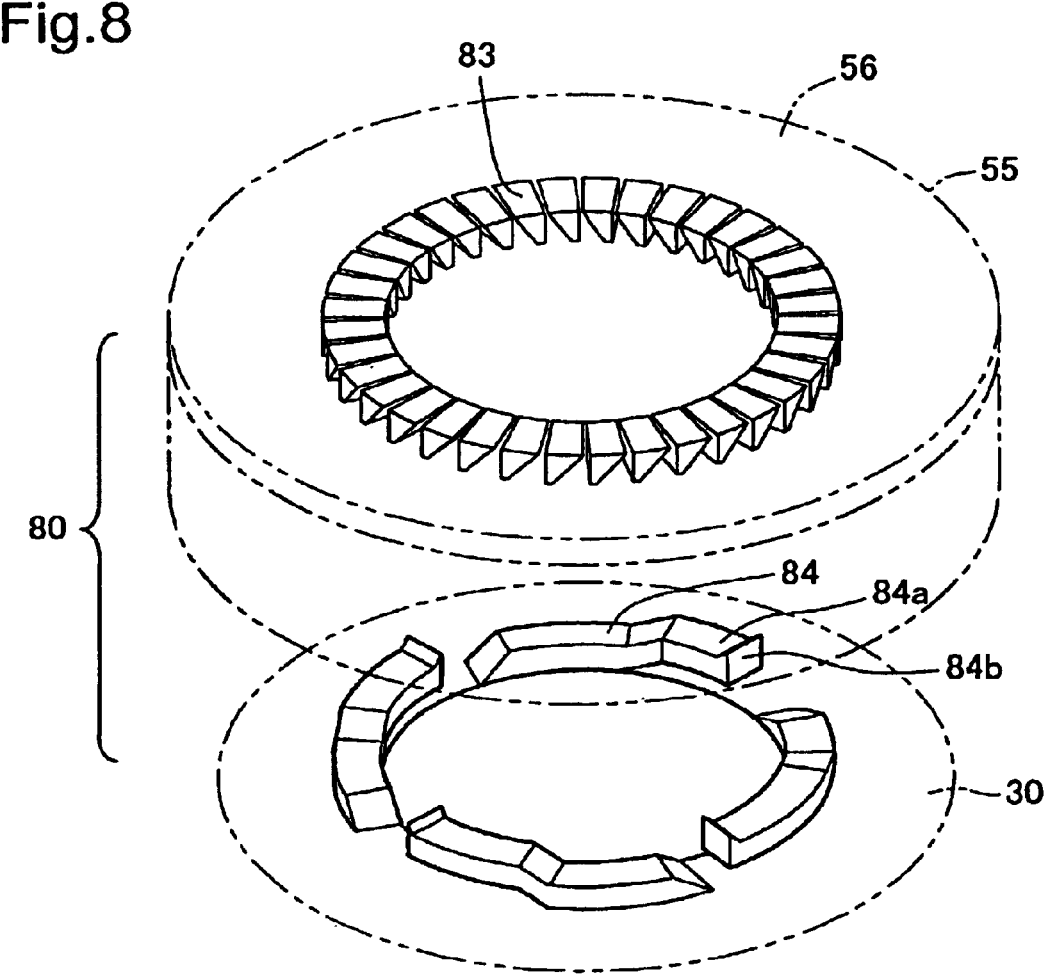
FIG. 8 is a perspective view illustrating the torque mechanism.
Figure 9:
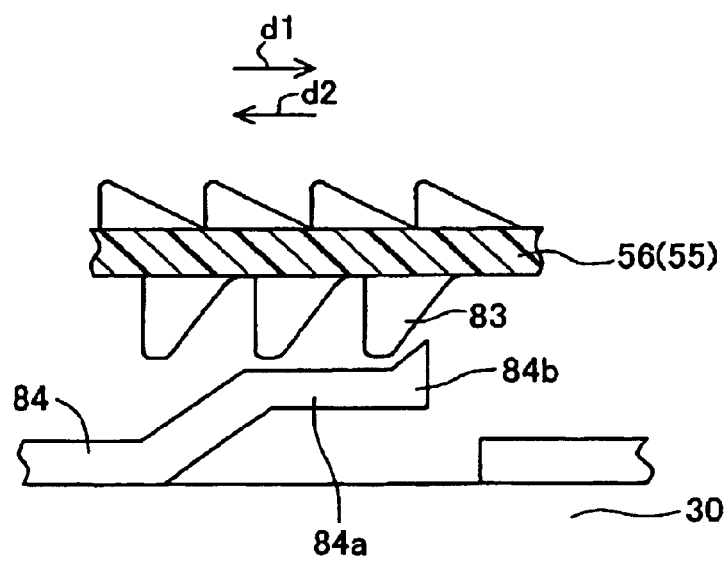
FIG. 9 shows the torque mechanism.

FIG. 8 is a perspective view illustrating the torque mechanism 80; and FIG. 9 shows the torque mechanism 80. The torque mechanism 80 is a mechanism for providing a feeling of attachment when rotational torque in excess of a predetermined level is applied to the handle mechanism 40 when installing the fuel cap 10 in the filler neck opening FNb, and allows the user to ascertain that the fuel cap 10 has been attached to the filler neck FN at a predetermined level of rotational torque.

The torque mechanism 80 comprises four torque arms 84 formed on the inner seal plate 30, and torque teeth 83 formed on the lower face of the upper wall 56 of the torque interlock member 55. Each of the torque arm 84 has an arm body 84a extending from the upper face of the inner seal plate 30, and a torque pawl 84b formed at the end of arm body 84a. The arm body 84a has a gap between the arm body 84a and the upper face of the inner seal plate 30, and is supported in cantilever fashion. The torque teeth 83 are arranged at a intervals in a circle on the lower face of the upper wall 56 of the torque interlock member 55. Each torque tooth 83 is constricted towards its lower end so as to engage the torque pawls 84b.

Figure 11:
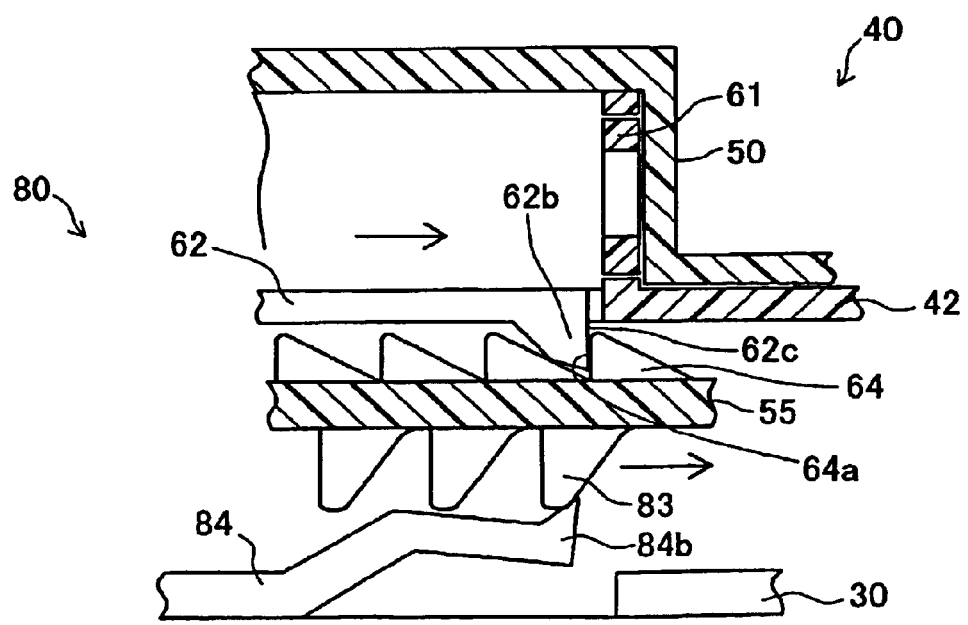
FIG. 11 is a cross section taken along line 11—11 in FIG. 10.

As shown in FIG. 9, by means of the arrangement for the torque mechanism 80, as the torque tooth 83 advances in the clockwise direction d1 relative to the torque pawl 84b, the torque teeth 83 comes into abutment with the torque pawl 84b at an obtuse angle, and when force applied to the torque pawl 84b exceeds a predetermined level, the torque pawl 84b is pushed downwardly, allowing the torque teeth 83 to ride up over the torque pawl 84b (see FIG. 11). The handle mechanism 40 (FIG. 3 etc.) is thereby able to turn relative to the casing body 20. At this point the user will notice a feeling of attachment. Conversely, where the torque tooth 83 comes into abutment with the torque pawl 84b from the counterclockwise direction d2, The torque teeth 83 abuts the torque pawl 84b at an acute angle and therefore cannot ride up over the torque pawl 84b (see FIG. 15). Thus, the handle mechanism 40 rotates integrally with the casing body 20.

(3) Fuel Cap 10 Removal/Installation Operation

Following is a description of the removal/installation operation performed when removing and installing the fuel cap 10 within the filler neck opening FNb of the filler neck FN.

(3)-1 Fuel Cap 10 Installation Operation

As shown in FIG. 3, with the filler neck opening FNb uncapped, the fuel cap 10 is inserted into the filler neck opening FNb from the bottom end of the casing body 20, the user gripping the operating portion 47 of the handle mechanism 40. At this time the casing engaging portion 20a is aligned with the neck insertion notch FNd of the filler neck FN, inserting the fuel cap 10 into the filler neck opening FNb and applying rotational force to the operating portion 47 in the closing direction (clockwise direction).

Figure 10:
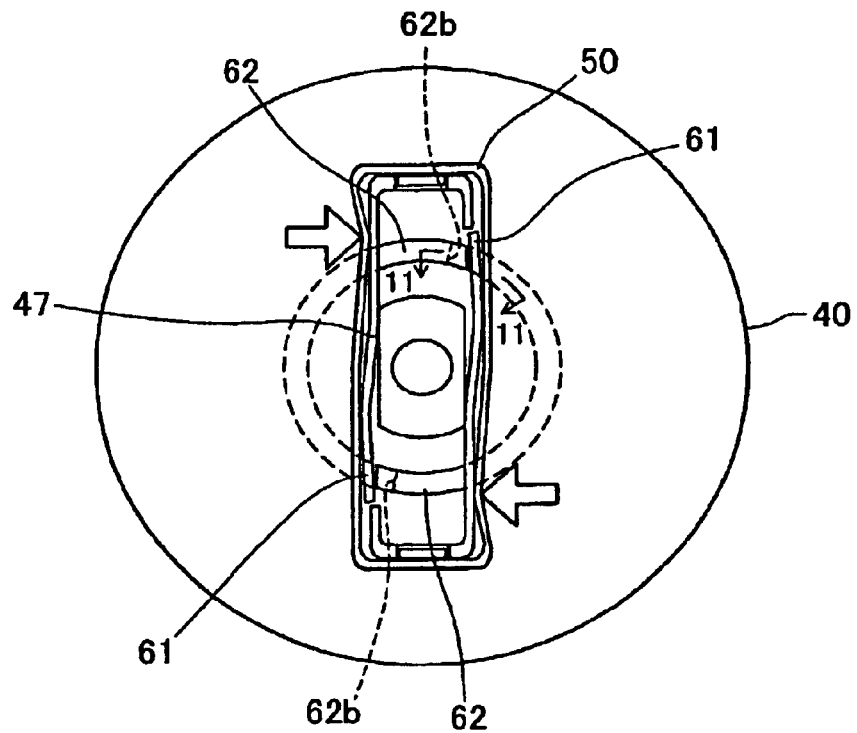
FIG. 10 shows the operation of the clutch mechanism during the fuel cap 10 installation operation, viewed from above.

FIG. 10 illustrates the fuel cap 10 as seen from above, and FIG. 11 illustrates a cross section taken along line 11—11 in FIG. 10. For the installation operation, as shown in FIG. 11, force is applied in a direction such is that the vertical faces 62c of the clutch pawls 62b come into abutment with the vertical faces 64a of the clutch teeth 64, so that the clutch teeth 64 move in tandem with motion of the clutch arms 62 in the direction indicated by the arrow. Rotational torque of the handle 40 is thereby transmitted to the torque interlock member 55. Rotation of the torque interlock member 55 causes the torque teeth 83 to abut the torque pawls 84b. Torque teeth 83 come into abutment with the torque arms 84 at locations in the direction depressing the torque arms 84. When rotational torque below a predetermined level is applied to handle mechanism 40, the torque teeth 83 will not ride up over the torque pawls 84b, so that the torque interlock member 55 moves integrally with the inner seal plate 30. The casing engaging portion 20a thereby engages the neck engaging portion FNc as shown in FIG. 1 to attach the fuel cap 10 to the filler neck FN, providing closure to the filler neck opening FNb. When rotational torque in excess of a predetermined level is applied to handle mechanism 40, the torque teeth 83 will ride up over the torque pawls 84b so that the handle mechanism 40 turns freely relative to the casing body 20. This prevents over-tightening of the fuel cap 10.

(3)-2 Fuel Cap 10 Closed State

Figure 12:
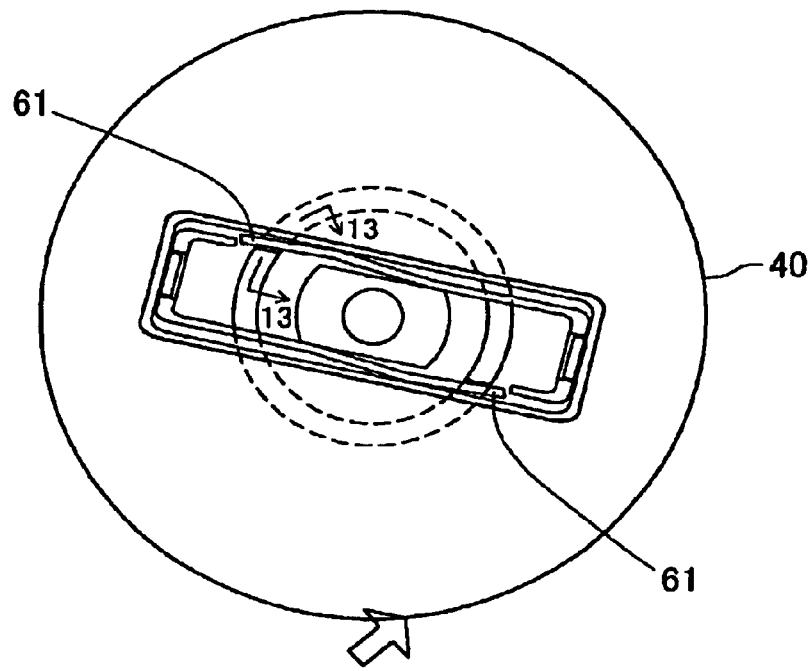
FIG. 12 shows the installed fuel cap installed on the filler neck, the fuel cap being subjected to external force.

As shown in FIG. 12, with the fuel cap 10 installed in filler neck opening FNb, in the event that the handle mechanism 40 should be subjected to external force occurring in a vehicle collision or the like, the fuel cap 10 will operate as follows.

Figure 13:
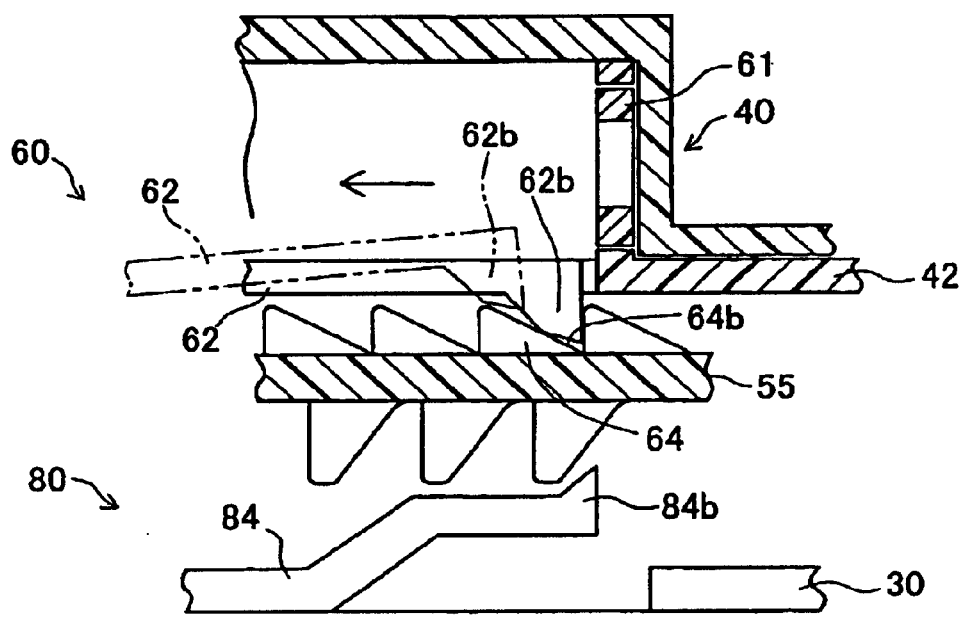
FIG. 13 is a cross section taken along line 13—13 in FIG. 12.

If an external force is directed in the counterclockwise direction indicated by the arrow, i.e. the direction of removing the fuel cap 10, the handle mechanism 40 will rotate freely. Specifically, as shown in FIG. 13, when the handle mechanism 40 is subjected to force acting in the opening direction, the clutch pawls 62b will come into abutment with the sloping faces 64b of the clutch teeth 64 and ride up over the clutch teeth 64. The handle mechanism 40 will therefore slip by the clutch mechanism 60 and rotate freely, preventing force in the removal direction from being transmitted to the casing body 20, so that the seal is maintained.

Conversely, if an external force is directed in the clockwise direction, the state is the same as that depicted in FIG. 11, namely, while force on the handle mechanism 40 in the closing direction is transmitted to the torque mechanism 80 via the clutch mechanism 60, the torque mechanism 80 rotates freely if the rotational torque exceeds a predetermined level, thus maintaining the seal while preventing over-tightening.

(3)-3 Fuel Cap 10 Removal Operation

With the fuel cap 10 installed in the filler neck FN as shown in FIG. 1, when the user grasps the operating portion 47 of the handle mechanism 40, force is applied to the operating portion 47 in the counterclockwise direction, i.e. the opening direction. Since the location at which force is applied to operating portion 47 is the location of the clutch switch 61, indicated by an arrow, the free end 61b of the clutch switch 61 elastically deforms inwardly to the actuated state and moves above the clutch pawls 62b of the clutch arms 62.

Figure 15:
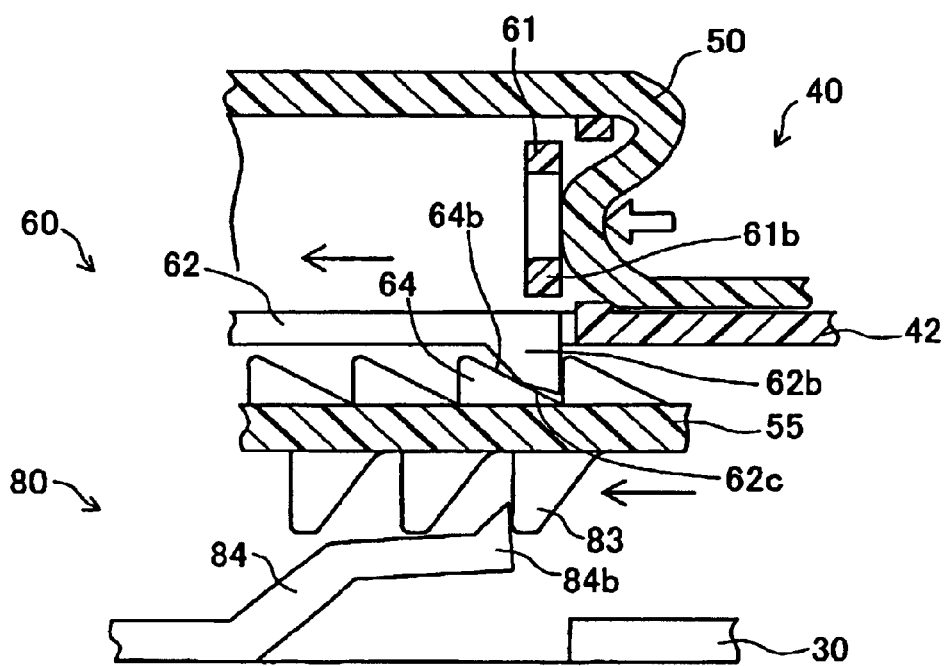
FIG. 15 shows a structure taken along line 15—15 in FIG. 14.

When rotational force is applied to handle body 42, the clutch pawls 62b come into abutment with the sloping faces 64b of the clutch teeth 64 and are subjected to upwardly directed force as shown in FIG. 15; however, as the free end 61b of the clutch switch 61 is located above the clutch pawls 62b, upward movement of the clutch pawls 62b is restricted thereby. The clutch pawls 62b therefore do not ride up over the clutch teeth 64, so that the torque interlock member 55 is subjected to force in the opening direction via the clutch teeth 64.

With rotation of the torque interlock member 55 in the closing direction, since the torque mechanism 80 is in the engaged state, i.e. the direction is such that the torque teeth 83 uplift the torque pawls 84b, no slippage occurs therebetween so that the inner seal plate 30 and casing body 20 rotate in tandem with the torque interlock member 55. The casing engaging portion 20a disengages from the neck engaging portion FNc, releasing the casing body 20 from constricting force relative to the filler neck FN so that the handle mechanism 40 can be withdrawn in the axial direction to remove the fuel cap 10 from the filler neck FN.

(4) Objects and Advantages of Fuel Cap 10

Figure 14:
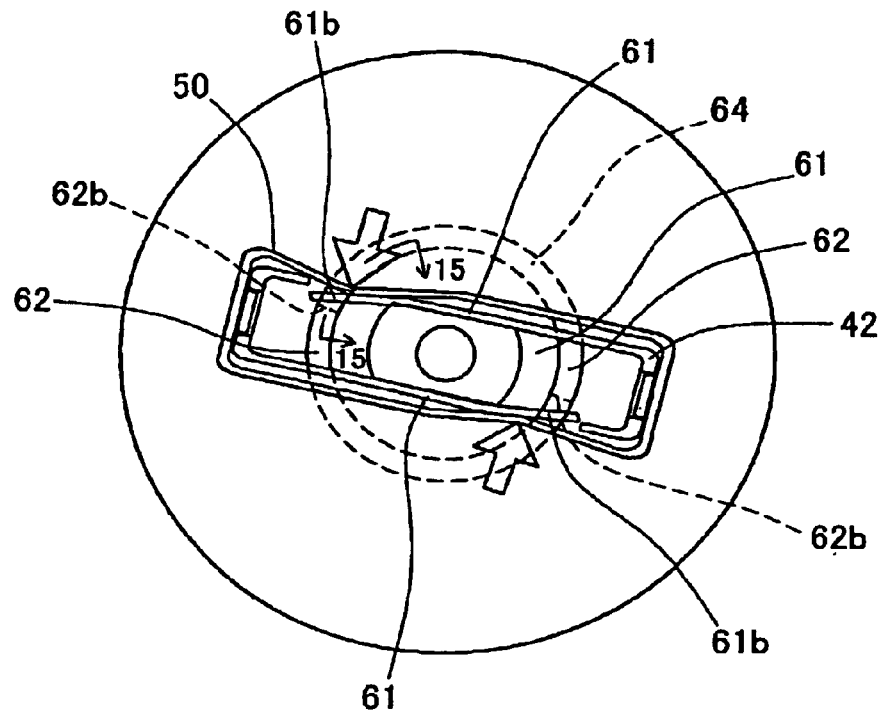
FIG. 14 shows the operation of the clutch mechanism during the fuel cap removal operation, viewed from above.

(4)-1 During the fuel cap 10 removal operation, squeezing the operating portion 47 of the handle mechanism 40 as shown in FIG. 14 switches the clutch mechanism 60 to the engaged state illustrated in FIG. 15, that is, force supporting the operating portion 47 is utilized to induce the clutch switch 61 to flex, placing the clutch mechanism 60 to the engaged state, thereby affording superior ease of operation.

(4)-2 Rather than using squeezing force applied by the user to the operating portion 47 to maintain the clutch mechanism 60 in the engaged state, i.e. to maintain force pushing the clutch pawls 62b against the clutch teeth 64, the high rigidity of the cross sectional secondary moment of the clutch switch 61 is utilized, whereby the clutch mechanism 60 will not switch to the disengaged state as long as the user does not relax the squeezing force applied to the operating portion 47 so as to allow the clutch switch 60 to return to its original position, thus providing superior ease of operation.

(4)-3 With the fuel cap 10 installed in the filler neck opening FNb and attached to the filler neck FN, if the handle mechanism 40 should be subjected to force in the opening direction, the clutch mechanism 60 will turn freely, so that the casing main body 20 is not subjected to rotational force by external force applied to the handle mechanism 40, thus maintaining the filler neck opening FNb in the capped state and maintaining the seal.

(4)-4 In the process of installing the fuel cap 10, riding up of the torque teeth 83 of the torque mechanism 80 over the torque arms 84 as shown in FIGS. 13 and 14 provides the feeling of attachment that allows the user to ascertain that the fuel cap 10 has been tightened to a predetermined level of torque, thus providing tightening to consistent torque regardless of the elasticity of the gasket GS and the like.

Figure 16:
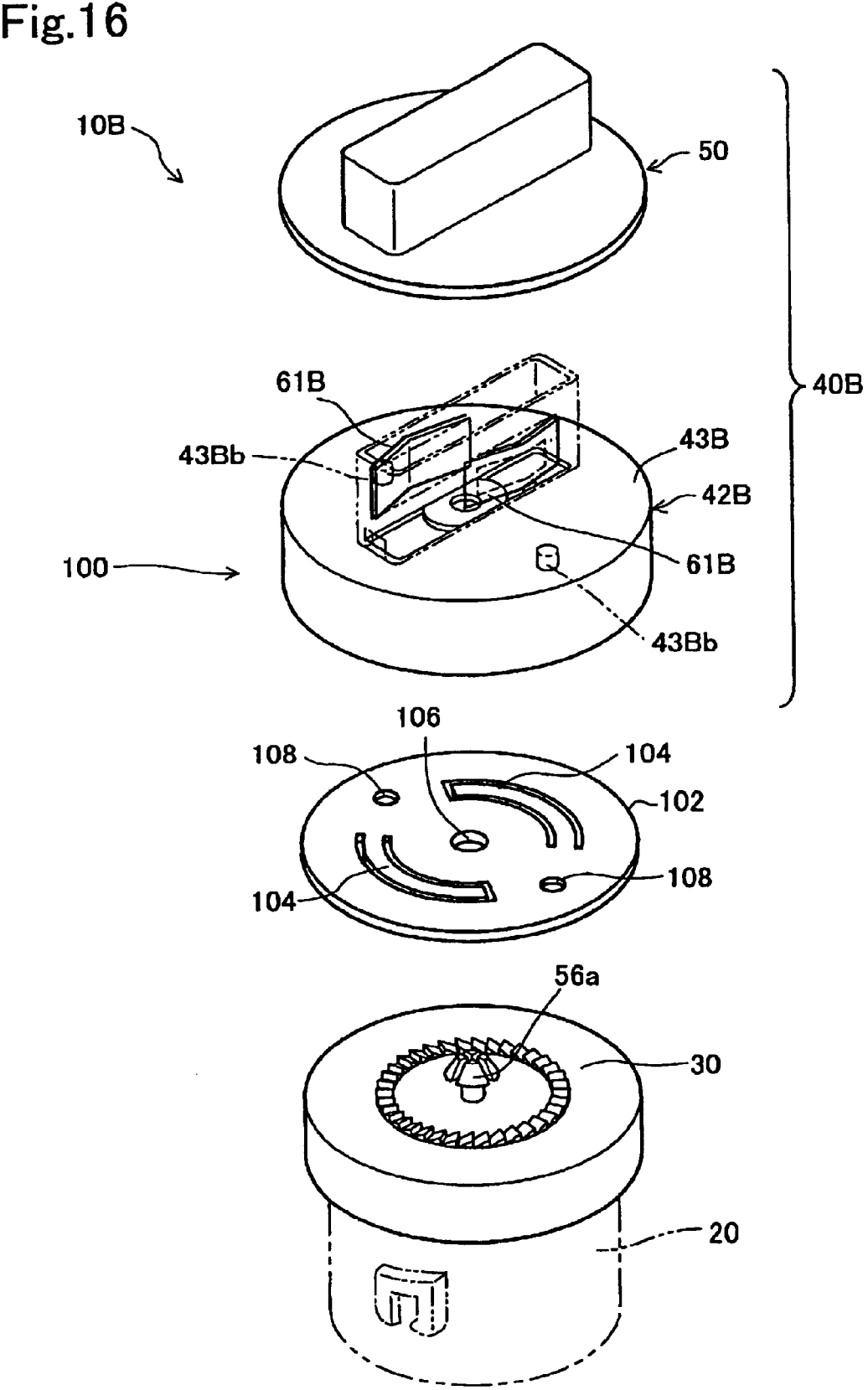
FIG. 16 is a decomposed perspective view illustrating a handle mechanism and an interconnecting mechanism pertaining to a second embodiment of the present invention

FIG. 16 is a decomposed perspective view illustrating a handle mechanism 40B and an interconnecting mechanism 100 disposed on the upper portion of the casing main body 20 pertaining to a second embodiment of the present invention. The fuel cap 10B of the second embodiment is characterized by the interconnecting mechanism 100 that has a torque plate 102 with torque arms 104 and 104.

Figure 17:
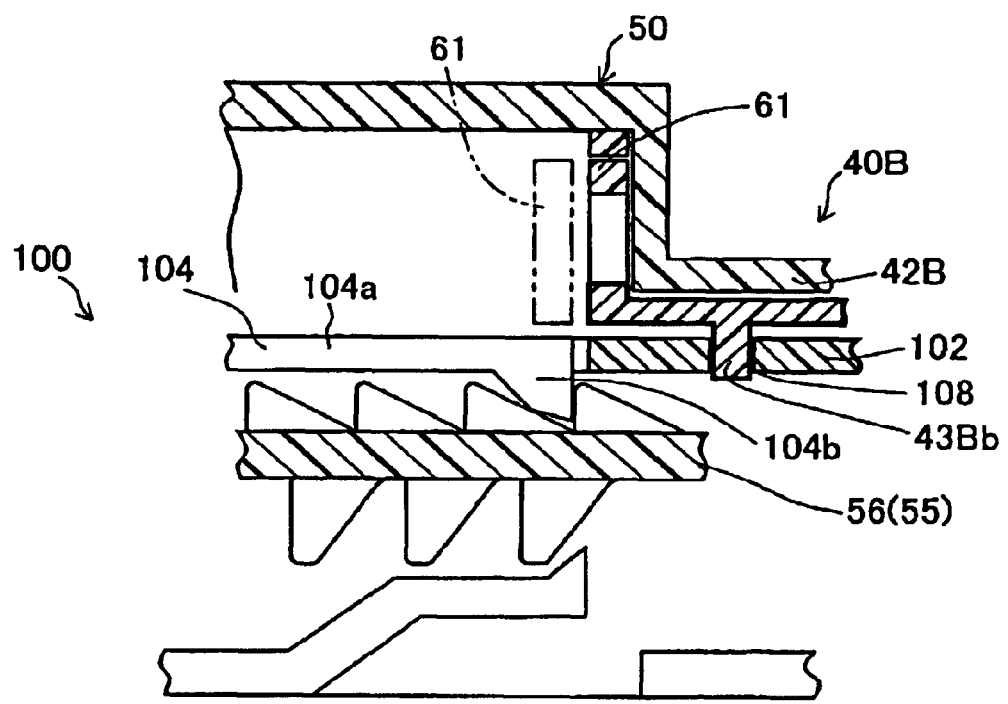
FIG. 17 is a sectional view illustrating the interconnecting mechanism.

The casing main body 20 and a clutch switch 61B are constructed as same as in the first embodiment described above, and will not be further described. The torque plate 102 is formed as disk-shaped plate and interposed between a handle mechanism 40B and a casing body 20. The torque plate 102 comprises a pair of the arc-shaped clutch arms 104 and 104. As shown in FIG. 17, each of the clutches arm 104 comprises an arm body 104a and a clutch pawl 104b formed on an end of the arm body 104a. The clutch pawl 104b projects toward the casing body 20. The clutch arms 104 are disposed in two axially symmetrical locations in the center of the torque plate 102. In FIG. 16, a through hole 106 is formed in the center of the torque plate 102. The connector projection 56a projecting on the inner seal plate 30 passes through the through hole 106, the torque plate 102 being rotatably supposed on the casing body 20 via the connector projection 56Bb and the through hole 106. The torque plate 102 comprises holes 108 that are formed between the clutch arms 104 and 104. Two projections 43Bb projecting on the lower portion of an upper wall 43B pass through the holes 108 and 108, respectively, the torque plate 102 being supposed on the handle body 42B. The torque plate 102 is configured to rotate with the handle mechanism 40B in the closing and opening direction and move in the axial direction.

While the present invention has been shown and described with reference to certain preferred embodiments, it is not limited thereto, and various modifications thereto will be apparent without departing from the scope and spirit thereof, such as the following.

The preceding embodiment describes an arrangement for actuating the clutch switch through application of rotational force in the opening direction, but is not limited thereto, it being possible to employ an arrangement whereby the clutch switch is actuated simply by squeezing the handle.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cap device comprising a cap configured to open and close a tank opening, the cap comprising:

a closer for closing the tank opening with air-tight sealing;

a handle mechanism rotatably mounted on the closer, the handle mechanism having an operation portion that is operable to close and open the tank opening; and an interconnecting mechanism, provided between the handle mechanism and the closer, for transmitting to the closer rotational torque in a closing direction and an opening direction when the rotational torque is applied to the handle mechanism to open and close the tank opening, wherein the interconnecting mechanism includes;

a clutch switch having a closing position and an opening position, the clutch switch being configured to be switchable from the closing position to the opening position when a user operates the handle mechanism to open the tank opening; and a one-way clutch unit having a first transmission mode and a second transmission mode, the first transmission mode being a mode in which the one-way clutch unit transmits the torque applied to the handle mechanism in the closing direction to the closer within a predetermined torque range and rotates freely in the opening direction when the clutch switch is switched to the closing position, the second mode being a mode in which the one-way clutch unit transmits the torque applied to the handle mechanism in the opening direction to the closer when the clutch switch is switched to the opening position, wherein the clutch switch is disposed on the handle mechanism and is configured to shift the one-way clutch unit to the second transmission mode when the operation portion is squeezed by the user.

2. The cap device according to claim 1, wherein the clutch switch is configured to shift the one-way clutch unit to the second transmission mode when the operation portion squeezed by the user is turned in the opening direction.

3. The cap device according to claim 1, wherein the clutch switch comprises a cantilever formed on a side wall of the operating portion, the cantilever having a free end, wherein the cantilever is configured to deform when the free end in pressed by the user, thereby shifting the one-way clutch unit to the second transmission mode.

4. The cap device according to claim 3, wherein the clutch switch is configured to have a first flexural rigidity against squeezing of the operating portion and a second flexural rigidity to maintain the one-way clutch unit in the second transmission mode, the first flexural rigidity being lower than the second flexural rigidity.

5. The cap device according to claim 1, wherein the one-way clutch unit comprises clutch teeth arranged ins circle and a clutch pawl for engaging and disengaging the clutch teeth.

6. The cap device according to claim 5, wherein the clutch switch is configured to restrict movement of the clutch pawl to maintain the interconnecting mechanism to the second transmission mode.

7. The cap device according to claim 1, wherein the handle mechanism comprises a handle body having the clutch switch, and the interconnecting mechanism comprises a torque interlock member furnished with the one-way clutch unit, the torque interlock member being attached to the handle body.

8. The cap device according claim 7, wherein the handle mechanism comprises a handle cover covering the handle body, the handle cover being made of material that is deformable so as to transmit elastic deformation of the handle cover to the clutch switch.

9. The cap device according to claim 1, wherein the interconnecting mechanism comprises a torque mechanism, the torque mechanism being configured to maintain the rotational torque transmitted from the handle mechanism to the closer in the closing direction below a predetermined level.

10. The cap device according to claim 9, wherein the torque mechanism comprises torque teeth disposed in a circle and a torque arm, the torque arm being configured to override the torque teeth when a predetermined or greater torque is applied to the torque teeth.

11. The cap device according to claim 5, wherein the clutch teeth are arranged on an upper portion of the closer, a torque plate is attached to the handle mechanism, and a clutch pawl is arranged on the torque plate.

12. A cap device comprising a cap configured to open and close a tank opening, the cap comprising:

a closer for closing the tank opening with air-tight scaling;

a handle mechanism rotatably mounted on the closer, the handle mechanism having an operation portion that is operable to close and open the tank opening; and an interconnecting mechanism provided between the handle mechanism and the closer, for transmitting to the closer rotational torque in a closing direction and an opening direction when the rotational torque is applied to the handle mechanism to open and close the tank opening, wherein the interconnecting mechanism includes:

a clutch switch having a closing position and an opening position, the clutch switch being-configured to be switchable from the closing position to the opening position when a user operates the handle mechanism to open the tank opening; and a one-way clutch unit having a first transmission mode and a second transmission mode, the first transmission mode being a mode in which the one-way clutch unit transmits the torque applied to the handle mechanism in the closing direction to the closer within a predetermined torque range and rotates freely in the opening direction when the clutch switch is switched to the closing position, the second mode being a mode in which the one-way clutch unit transmits the torque applied to the handle mechanism in the opening direction to the closer when the clutch switch is switched to the opening position, wherein:

the handle mechanism comprises a handle body having the clutch switch;

the interconnecting mechanism comprises a torque interlock member furnished with the one-way clutch unit, and the torque interlock member is attached to the handle body; and the handle mechanism comprises a handle cover covering the handle body, and the handle cover is made of material that is deformable to transmit elastic deformation of the handle cover to the clutch switch.

13. A cap device comprising a cap configured to open mid close a tank opening, the cap comprising:

a closer for closing the tank opening with air-tight sealing;

a handle mechanism rotatably mounted on the closer, the handle mechanism having an operation portion that is operable to close and open the tank opening; and an interconnecting mechanism provided between the handle mechanism and the closer, for transmitting to the closer rotational torque in a closing direction and an opening direction when the rotational torque is applied to the handle mechanism to open and close the tank opening, wherein the interconnecting mechanism includes:

a clutch switch having a closing position and an opening position, the clutch switch being configured to be switchable from the closing position to the opening position when a user operates the handle mechanism to open the tank opening; and a one-way clutch unit having a first transmission mode and a second transmission mode, the first transmission mode being a mode in which the a one-way clutch unit transmits the torque applied to the handle mechanism in the closing direction to the closer within a predetermined torque range and rotates freely in the opening direction when the clutch switch is switched to the closing position, the second mode being a mode hi which the one-way clutch unit transmits the torque applied to the handle mechanism in the opening direction to the closer when the clutch switch is switched to the opening position. wherein:

the interconnecting mechanism comprises a torque mechanism, and the torque mechanism is configured to maintain the rotational torque transmitted from the handle mechanism to the closer in the closing direction below a predetermined level; and the torque mechanism comprises torque teeth disposed in a circle and a torque arm, and the torque arm is configured to override the torque teeth when a predetermined or greater torque is applied to the torque teeth.

* * * * *